United States Patent [19]

Pagano

[11] Patent Number: 5,005,035
[45] Date of Patent: Apr. 2, 1991

[54] CAMERA OPERATING MECHANISM
[75] Inventor: Daniel M. Pagano, Henriette, N.Y.
[73] Assignee: Eastman Kodak Company, Rochester, N.Y.
[21] Appl. No.: 439,217
[22] Filed: Nov. 20, 1989
[51] Int. Cl.⁵ .................. G03B 17/42; G03B 1/62; G03B 1/00; G03B 17/36
[52] U.S. Cl. .................. 354/206; 354/213; 354/215; 354/217
[58] Field of Search .............. 354/217, 21, 212, 213, 354/214, 215, 204, 206, 266

[56] References Cited
U.S. PATENT DOCUMENTS
4,057,814 11/1977 Grünbacher et al. .............. 354/204

Primary Examiner—L. T. Hix
Assistant Examiner—Jae N. Noh

[57] ABSTRACT

Operating mechanism for cameras, particularly of the single use type, in which a first gear wheel depressed by the shutter release button thus unblocks a spring biased slide member initially blocked against movement by engagement of an edge of the slide member with the periphery of the gear wheel. Upon release, the slide member moves partially over the gear wheel and blocks the wheel's spring biased movement to its original position. The slide member actuates the shutter in the course of such movement. A second gear wheel, meshing with the first gear wheel, lies below the slide member and carries a cam which lies in an opening in the slide member and engages the slide member to move it back to its original position when the first gear wheel is rotated by the user to transport film to the next exposure. Lugs carried by the slide member and the second gear wheel cooperate to limit rotation of the gear wheels to that appropriate to film transport to the next exposure. A counter is driven by rotation of the gear wheels.

13 Claims, 3 Drawing Sheets

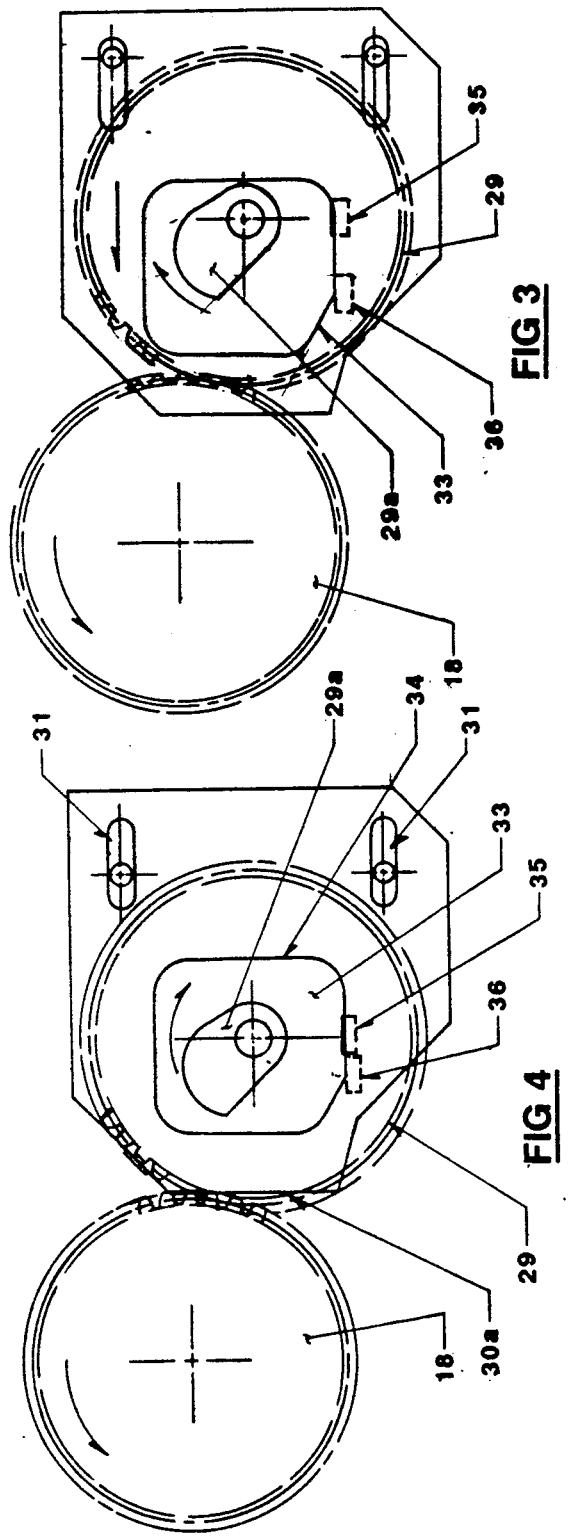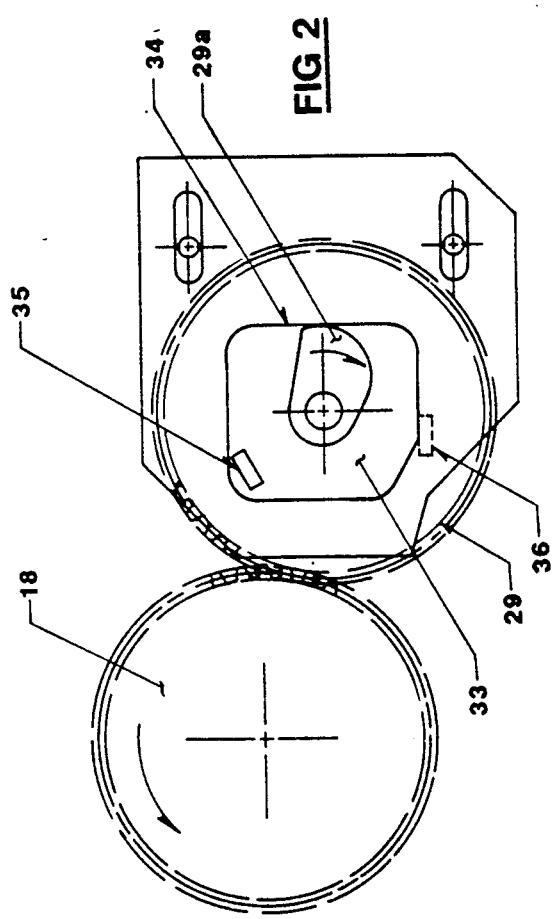

CAMERA OPERATING MECHANISM

BACKGROUND OF THE INVENTION

1. Field of the Invention

The invention relates to operating mechanism for cameras, particularly "throw away" cameras which are discarded after a single use. The mechanism is of simple, inexpensive construction, yet provides reliable shutter actuation, double exposure prevention, film winding with automatic winder lock-up at each film frame, and exposure counting.

2. Description of the Prior Art

U.S. Pat. No. 4,057,814, issued Nov. 8, 1977 discloses an electrically operated shutter in a camera having a rotatable winding knob which moves the film in the camera and cocks a shutter. Rotation of the winding knob displaces a slide between an initial position to which it is urged by a spring, and an end position. In its initial position, the slide blocks a shutter release button against actuation. Movement of the slide to its end position releases the button for actuation. Coaction between the release button and the slide releases the slide for spring biased movement to its initial position upon actuation of the release button, such movement operating electric contact means to operate the camera shutter.

From a study of the following specification and appended drawings it will be seen that the present invention differs broadly in construction and operation from the above discussed patent. While the present invention also uses a slide, the slide actuates the shutter by spring action upon depression of the shutter release button by the user. The slide is blocked against shutter actuating movement from its cocked position by contact with the periphery of a film winding gear wheel, the latter being moved to an unblocking position by depression of the shutter release button. Rotation of the gear wheel rotates a second gear wheel which has a raised cam surface lying within an opening in the slide and operable upon rotation of the first gear wheel to move the slide against the spring pressure back to cocked position. The first gear wheel carries the shutter release button and is spring urged to the slide blocking position. The first gear wheel also operates the film transport mechanism. Lugs on the second gear wheel and slide cooperate to limit rotation of the gears to an amount which moves the film by one frame. There is also a counter mechanism operated by one of the gear wheels. In the preferred embodiment disclosed, the construction is entirely mechanical.

From the foregoing description it should be clear that the present invention is new and unobvious over the patented construction.

SUMMARY OF THE INVENTION

The invention has been described in some detail in the foregoing section. In broader terms, the invention resides in operating mechanism for a camera, comprising first gear means mounted for axial and rotary movement and carrying a shutter release button accessible to the user by virtue of its projecting outside the camera, a position to which it is urged by means biasing the first gear wheel. A slide member carrying shutter actuating means, such as a projecting arm, is biased for sliding, shutter actuating movement from a cocked position, but is blocked from such movement by contact of an edge of the slide member with the periphery of said first gear means. Depression of the shutter release button moves the gear means out of blocking contact with the slide member, thus releasing the slide member for shutter actuating movement. Second gear means is driven by the first gear means and carries a cam which moves the slide clear of the first gear means and back to cocked position as the first gear means is rotated to transport film after an exposure. This action permits the first gear means to move back up to its original position with its periphery in position to block movement of the slide member.

The second gear means has an upstanding lug which cooperates with a lug on the slide member to limit rotation of the two gear means to an amount appropriate to film transport to the next film exposure area. Rotation of the gear means also actuates a counter by means of a lug carried by the first gear means and positioned out of the way of the slide member.

BRIEF DESCRIPTION OF THE DRAWINGS

FIG. 2 is a top view of the gears and slide member during the winding process;

FIG. 3 is a view similar to FIG. 2, but with the parts in their positions immediately following an exposure and before film winding to the next frame;

FIG. 4 is a view similar to FIGS. 2 and 3, with the slide member in the cocked position and the lugs on the slide member and the second gear wheel cooperating to stop winding rotation of the gear wheels.

DETAILED DESCRIPTION OF THE PREFERRED EMBODIMENT

Figure 1:
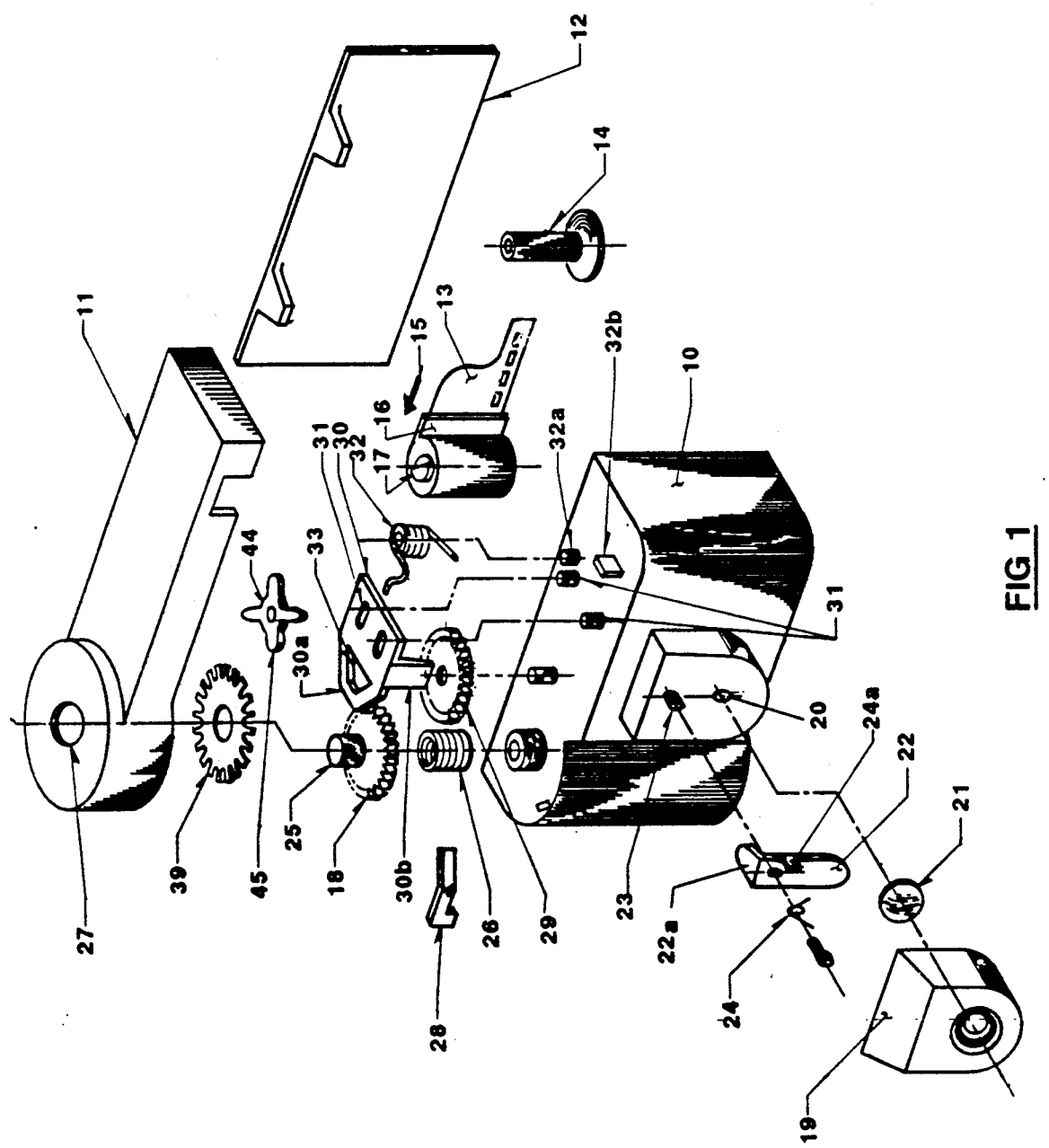
FIG. 1 is an exploded view, in perspective and diagrammatic in nature, generally disclosing the parts of the mechanism.

Referring now to FIG. 1, there is shown a camera body 10 which includes a top cover 11 and a back 12. In the embodiment shown, the camera is a single use, "throw away" camera which is discarded by the film processor after breaking open the camera and removing the film. Film is shown at 13 and is wound from spool 14 which is loaded in the camera at the factory, and moved in the direction of arrow 15 into a standard film cassette 16, such as that widely used as the supply cassette for 35 mm film. Cassette 16 has a core extending outside the cassette and having a portion 17 drivable by rotation of a gear 18 to transport film into the cassette.

The camera has a front cover 19 mounted on the front of body 10 and provided with an exposure aperture 20. The front cover houses a taking lens 21 and a pivoted blade shutter 22 mounted on a post 23 and having a projecting actuating arm 22a. A spring 24 biases the shutter blade to the shutter closed position by engagement with tab 24a.

Gear 18 is aligned axially with the core of cassette 16 and carries an upwardly and axially extending shutter release button 25 which is circular in cross section. Spring 26 biases gear 18 and button 25 upwardly toward a position in which the button projects outside the camera through a circular opening 27 in cover 11 so as to be accessible to the camera user.

The periphery of gear 18 extends outside the camera body so as to be accessible to the user for winding film, recocking the shutter mechanism and operating a counter. Ratchet 28 fixed at one end to the camera body engages the gear teeth on gear wheel 18 to prevent the latter's reverse rotation, that is, rotation in other than the film transporting direction.

Second gear wheel 29 meshes with gear wheel 18 in all positions of the latter so as to be rotated by rotation of gear wheel 18. Overlying gear wheel 29 is slide member 30 which is reciprocably mounted on the camera body by pin and slot means 31. A high energy spring 32 mounted on a post 32a engages at one end stop 32b on the camera body and the other end engages slide member 30 to bias it strongly toward gear wheel 18. Slide member 30 has an edge 30a which in the cocked position contacts the periphery of gear wheel 18, and also has a central opening 33 which is seen in more detail in FIGS. 2-4.

A downwardly extending arm 30b on slide member 30 cooperates with actuating arm 22a on shutter blade 22. An upwardly extending cam 29a on the upper surface of gear wheel 29 extends into opening 33 and is configured so as to engage an edge 34 of opening 33 when film is being transported, thereby to move slide member 30 against the bias of spring 32 to the position shown in FIG. 2.

Gear wheel 29 also has an upstanding lug 35 which cooperates with a downwardly extending lug 36 carried by the slide member, cooperation of these projecting means, as seen in FIG. 4, serving to limit rotation of gear wheel 29.

Figure 5:
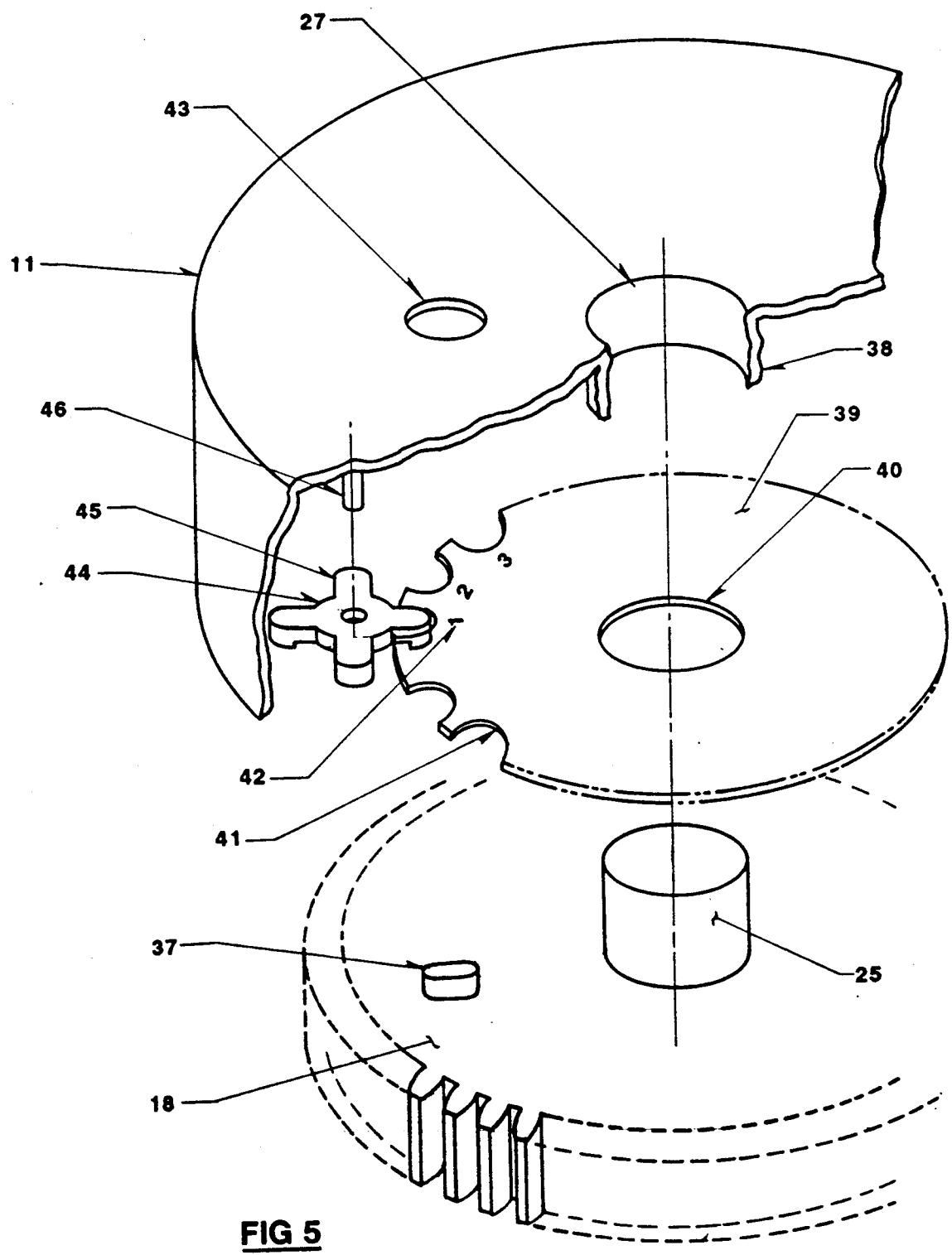
FIG. 5 is an exploded perspective view showing the first gear wheel and the counter mechanism parts operated thereby.

FIG. 5 shows in exploded detail the counter assembly. Gear wheel 18 has an upstanding lug 37 projecting from its upper surface and spaced inwardly from the periphery of gear wheel 18 far enough so that it does not interfere with slide member 30 when the latter overlaps gear wheel 18, as in FIG. 3. Top cover 11 has a downwardly extending flange 38 around opening 27, the flange receiving the central opening 40 of a counter wheel 39. When the parts are assembled flange 38 fits around shutter release button 25 and counter wheel 39 lies atop gear wheel 18. Counter wheel 39 has spaced peripheral indentations or cut outs 41 and bears, numbers 42 on its upper surface for viewing by the user through a window 43 in top cover 11.

A counter lever 44 in the form of an element having four equally spaced radial arms 45 is rotatable mounted on a projection 46 extending downwardly from top cover 11. Counter lever 44 is positioned to be rotated a quarter turn by engagement of lug 37 with one of the radial arms 45 each time gear wheel 18 makes a complete revolution. Radial arms 45 engage the cut outs 41 on the counter wheel so that each time counter lever 44 makes a quarter turn, counter wheel 40 is indexed by one number 42. Lug 37 lies outside the periphery of counter wheel 40.

Operation

Starting with the mechanism in cocked position as shown in FIG. 4, edge 30a of slide member 30 abuts the periphery of gear wheel 18 and is thus prevented from moving to the left in FIG. 4, even though it is strongly biased for such movement by spring 32. When the user depresses shutter release button 25 to make an exposure, gear wheel 18 is depressed so that its upper surface is lower than the lower surface of slide member 30, but gear wheel 29 has sufficient thickness to retain mesh with wheel 18 after wheel 18 is thus depressed. This depression of gear wheel 18 permits the slided member to slide over an edge portion of gear wheel 18 to the FIG. 3 position, and in doing so arm 30b on the slide member strikes actuating arm 22a on the shutter blade to flip the shutter blade to an open position from which it is immediately returned to closed position by spring 24. The period during which the shutter is open depends on the weight of the parts, location of the blade pivot, and the strength of spring 22. Only a single shutter speed is needed.

Once slide member 30 moves over gear wheel 18, the gear wheel is thus held down and spring 26 cannot move gear wheel upwardly so as to restore shutter release button 25 to its original position projecting outside the top cover of the camera. At this point, the user manually rotates gear wheel 18 by engaging a peripheral portion of the gear wheel that extends outside the camera. This rotation turns meshing gear wheel 29 in the clockwise direction as seen in FIG. 3, bringing a radially extending portion of cam 29a into contact with an edge 34 of the opening 33 in the slide member such that continued rotation of gear 29 moves cam 29a and thereby slide member 30 to the positions shown in FIG. 2.

Slide member 30 is thus moved clear of gear wheel 18 and spring 26 restores gear wheel 18 and shutter release button 25 to their original positions. Continued rotation of gear wheel 29 brings cam 29a back to the position shown in FIG. 4, rotation being terminated by contact of lug 35 with lug 36. It will be noted that when the slide member moves to the position shown in FIGS. 3, its leftward movement has moved its lug 36 beyond the path of movement of gear wheel lug 35. Such continued rotation of gear wheel 29 also permits spring 32 to move slide member 30 slightly to the left but its movement is stopped by engagement of its edge 30a with the periphery of gear wheel 18, as the latter has now moved up to its original position.

Rotation of gear wheel 18 by the user transports film to the next exposure position. The series of exposure positions are not evenly spaced due to the changing diameter of the film coil on the core of the take up cassette 16. The winding stops at each successive exposure position due to the cooperation of lugs 35 and 36 during film winding.

The camera user views exposure numbers through window 43. Lug 37 projecting from the upper surface of gear wheel 18 engages one of the radial arms 45 on counter lever 44 on each full revolution of gear wheel 18 and rotates the counter lever by a quarter turn. The radial arms 45 successively engage one of the cut outs 41 of counter wheel 39 and rotate it by one exposure number. The cut outs 41 and exposure numbers are located in accordance with the uneven spacing of the successive exposures.

As previously mentioned, the described structure is particularly intended for a single use, "throw away" camera that is broken open and discarded by the film processor after removing the film. Thus there is no reloading of the camera or any resetting of the counter mechanism.

The described structure utilizes a minimum number of parts, yet achieves all necessary camera functions of shutter release and actuation, film winding, automatic lock up of film winding at each successive exposure location, double exposure prevention, and exposure counting.

The invention has been described with reference to a preferred embodiment. However, it will be appreciated that variations and modifications can be effected within the ordinary skill of the art without departing from the scope of the invention. For example, portions of the described apparatus may be incorporated in cameras without using the entire disclosed construction.

I claim:

1. Operating mechanism for a camera having a shutter, actuation of which makes an exposure, comprising:
    first gear wheel means mounted for axial and rotary movement, and carrying a shutter release button normally projecting outside the camera so as to be accessible to the camera user;
    means biasing said first gear wheel means to urge said button to said projecting position;
    a slide member carrying shutter actuating means and biased for sliding, shutter actuating movement from a cocked position, an edge of said slide member being in contact with the periphery of said first gear wheel means when in cocked position, said slide member thereby being blocked against shutter actuating movement; and
    said first gear means being movable out of contact with said slide member by depression of said shutter release button, thereby releasing said slide member for shutter actuating movement.

2. Camera operating mechanism as set forth in claim 1, further comprising:
    said shutter actuating movement of said slide member moving said member to a position partially overlying said first gear means to block said first gear means against upward movement; and
    second gear wheel means rotatable by said first gear wheel means and comprising means for restoring said slide member to cocked position upon rotation of said first gear wheel means, such restoration releasing said first gear wheel means for upward movement to place the periphery thereof in blocking contact with said slide member.

3. Camera operating mechanism as set forth in claim 2, further comprising:
    said slide member overlying said second gear means and having an opening therein, and
    said means for restoring said slide member to cocked position comprising a raised cam surface on said second gear means cooperating with an edge of said opening to move said sliding member away from said first gear means.

4. Camera operating mechanism as set forth in claim 3, further comprising:
    projecting means on said second gear means and said slide member which cooperate to limit rotation of said second gear means and thereby limit rotation of said first gear wheel means.

5. Camera operating mechanism as set forth in claim 4, further comprising:
    means operated by rotation of said first gear means to wind film, and
    ratchet means cooperating with one of said gear means to lock said first gear means against reverse rotation of the film winding means.

6. Camera operating mechanism as set forth in claim 5, further comprising:
    a counter visible from outside the camera; and
    means operated by one of said gear wheel means to drive said counter.

7. Camera operating mechanism as set forth in claim 6, further comprising:
    said means for driving said counter comprising means projecting from the surface of said first gear wheel means out of the path of said slide member.

8. Camera operating mechanism as set forth in claim 7, said means for driving said counter further comprising:
    a rotatable element having radial arms, said arms being engageable by said projecting means to cause partial rotation of said rotatable element upon each full rotation of said first gear means; and
    a counter wheel operable by said rotatable element and bearing numbers visible to the camera user, said counter wheel being rotated to the extent of an exposure number by each partial rotation of said rotatable element.

9. Camera operating mechanism for a camera having a housing and a shutter which effects a film exposure upon actuation, comprising:
    a first gear wheel mounted for axial and rotary movement and carrying an axially extending shutter release button depressible by the camera user to depress said gear wheel;
    biasing means resisting depression of said shutter and gear wheel;
    a second gear wheel engaging and rotatable by first gear wheel;
    a slide member carrying shutter actuating means, said member having a cocked position in which it is biased into engagement with the periphery of said first gear and is thereby blocked from movement in the direction of the gear, which movement causes shutter actuation, said member having an opening overlying said second gear wheel;
    said second gear wheel having an upstanding cam substantially smaller than said opening and positioned within said opening to permit said member to slide in the direction of said first gear wheel to a position partly overlying said first gear wheel, and to restore said member to said cocked position by engagement with an edge of said opening upon rotation of said second gear wheel;
    said first gear wheel being movable out of said member-blocking position by depression of the shutter release button whereupon said member slides to said position partly overlying said first gear wheel, said movement actuating the camera shutter;
    ratchet means locking said first gear wheel against rotation in one direction; and
    rotation of said first gear wheel after shutter actuation causing rotation of said second gear wheel to move its cam against an edge of the opening in said member to restore the member to the cocked position.

10. Camera operating mechanism as set forth in claim 9, further comprising:
    cooperating lug means on said second gear wheel and slide member to limit rotation of second gear wheel and thereby also rotation of said first gear wheel.

11. Camera operating mechanism as set forth in claim 10, further comprising:
    film winding means operated by rotation of said first gear wheel;
    film counter means comprising:
    a projection on the upper surface of said first gear wheel and located out of the path movement of said slidable member;
    a rotatable counter lever having spaced radial arms engageable by said projection to index said counter lever upon each complete rotation of said first gear wheel; and
    a counter wheel bearing film exposure numbers and having peripheral indentations engageable by said radial arms to index said counter wheel by a film exposure number upon each indexing of said counter lever.

12. Camera operating mechanism as set forth in claim 11, said first gear wheel being positioned for rotation by the camera user to transport film, move said slide member to the cocked position, and index the counter.

13. Camera operating mechanism as set forth in claim 11, further comprising:

said camera housing having a circular opening for receiving said shutter release button;

said counter wheel having a central circular opening through which said shutter release button extends; and said body having a downwardly extending flange surrounding said opening and receiving the central opening of said counter wheel.

* * * * *